(12) United States Patent
Abuelsaad et al.

(10) Patent No.: US 10,089,067 B1
(45) Date of Patent: *Oct. 2, 2018

(54) CONTEXT BASED IDENTIFICATION OF NON-RELEVANT VERBAL COMMUNICATIONS

(71) Applicant: International Business Machines Corporation, Armonk, NY (US)

(72) Inventors: Tamer E. Abuelsaad, Armonk, NY (US); Gregory J. Boss, Saginaw, MI (US); John E. Moore, Pflugerville, TX (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,417

(22) Filed: Dec. 26, 2017

Related U.S. Application Data

(63) Continuation of application No. 15/601,092, filed on May 22, 2017.

(51) Int. Cl.
| | |
|---|---|
| *G10L 15/00* | (2013.01) |
| *G10L 15/26* | (2006.01) |
| *G10L 21/00* | (2013.01) |
| *G10L 25/00* | (2013.01) |
| *G06F 3/16* | (2006.01) |
| *G10L 15/18* | (2013.01) |

(Continued)

(52) U.S. Cl.
CPC .......... *G06F 3/165* (2013.01); *G10L 15/1815* (2013.01); *G10L 17/22* (2013.01); *G10L 21/0272* (2013.01); *H04M 3/568* (2013.01)

(58) Field of Classification Search
None
See application file for complete search history.

(56) References Cited

U.S. PATENT DOCUMENTS

| | | |
|---|---|---|
| 6,343,313 B1 | 1/2002 | Salesky et al. |
| 6,978,001 B1 | 12/2005 | Shaffer et al. |

(Continued)

OTHER PUBLICATIONS

Engelking, Carl, "New Earbuds Let You Manipulate Sounds in the World Around You", Jun. 2, 2015 1:34 PM, 3 pages, <http://blogs.discovermagazine.com/d-brief/2015/06/02/earbuds-hear/>.

(Continued)

*Primary Examiner* — Richemond Dorvil
*Assistant Examiner* — Thuykhanh Le
(74) *Attorney, Agent, or Firm* — Aaron N. Pontikos

(57) ABSTRACT

A computer-implemented method includes identifying a first set of utterances from a plurality of utterances. The plurality of utterances is associated with a conversation and transmitted via a plurality of audio signals. The computer-implemented method further includes mining the first set of utterances for a first context. The computer-implemented method further includes determining that the first context associated with the first set of utterances is not relevant to a second context associated with the conversation. The computer-implemented method further includes dynamically muting, for at least a first period of time, a first audio signal in the plurality of audio signals corresponding to the first set of utterances. A corresponding computer system and computer program product are also disclosed.

1 Claim, 3 Drawing Sheets

(51) Int. Cl.
*G10L 17/22* (2013.01)
*G10L 21/0272* (2013.01)
*H04M 3/56* (2006.01)

(56) References Cited

U.S. PATENT DOCUMENTS

| | | | |
|---|---|---|---|
| 7,978,838 B2 | 7/2011 | Rodman et al. | |
| 8,019,069 B1 | 9/2011 | Cyriac et al. | |
| 8,848,901 B2 | 8/2014 | Reynolds | |
| 8,887,070 B1 | 11/2014 | Hecht et al. | |
| 9,070,369 B2* | 6/2015 | Cox | H04L 12/1822 |
| 9,087,521 B2 | 6/2015 | Kreiner et al. | |
| 9,762,736 B2 | 8/2017 | Diethorn | |
| 2002/0039426 A1* | 4/2002 | Takemoto | G06F 3/165 |
| | | | 381/104 |
| 2006/0053010 A1 | 3/2006 | Chapman et al. | |
| 2007/0237336 A1* | 10/2007 | Diethorn | H04R 1/1083 |
| | | | 381/71.6 |
| 2008/0118042 A1 | 5/2008 | Hogg | |
| 2009/0220064 A1* | 9/2009 | Gorti | H04M 3/56 |
| | | | 379/202.01 |
| 2009/0228272 A1 | 9/2009 | Herbig et al. | |
| 2010/0067680 A1* | 3/2010 | Hanson | H04M 3/4285 |
| | | | 379/202.01 |
| 2010/0228547 A1* | 9/2010 | Scott | G06Q 30/02 |
| | | | 704/235 |
| 2010/0332220 A1* | 12/2010 | Hursey | H04M 3/42221 |
| | | | 704/201 |
| 2011/0112831 A1* | 5/2011 | Sorensen | G10L 21/0208 |
| | | | 704/226 |
| 2012/0121076 A1* | 5/2012 | Yoakum | H04L 12/1822 |
| | | | 379/202.01 |
| 2014/0222437 A1* | 8/2014 | Burton | H04M 1/72522 |
| | | | 704/278 |
| 2014/0309999 A1* | 10/2014 | Basson | G10L 25/00 |
| | | | 704/270 |
| 2015/0010169 A1* | 1/2015 | Popova | H04S 7/303 |
| | | | 381/107 |
| 2015/0085058 A1* | 3/2015 | Zhang | H04N 7/142 |
| | | | 348/14.02 |
| 2015/0131803 A1* | 5/2015 | Weksler | H04R 3/00 |
| | | | 381/56 |
| 2015/0179186 A1* | 6/2015 | Swierk | G06F 3/167 |
| | | | 704/276 |
| 2015/0269929 A1* | 9/2015 | Emery | G10L 15/30 |
| | | | 704/254 |
| 2015/0302865 A1* | 10/2015 | Pilli | H04L 65/604 |
| | | | 704/205 |
| 2015/0364097 A1* | 12/2015 | Nageli | G09G 3/3413 |
| | | | 345/593 |
| 2016/0073153 A1* | 3/2016 | Hou | H04N 21/439 |
| | | | 725/10 |
| 2016/0234593 A1* | 8/2016 | Matsumoto | H04R 1/406 |
| 2016/0255203 A1* | 9/2016 | Kreiner | H04M 3/2227 |
| | | | 379/202.01 |
| 2017/0034362 A1* | 2/2017 | Liu | H04M 1/725 |
| 2017/0115953 A1* | 4/2017 | Alders | G06F 3/165 |
| 2017/0236512 A1* | 8/2017 | Williams | G10L 15/22 |
| | | | 381/79 |
| 2017/0330566 A1* | 11/2017 | Trott | G10L 15/22 |
| 2017/0353694 A1* | 12/2017 | Yoakum | H04N 7/15 |

OTHER PUBLICATIONS

Larcker et al., "Detecting Deceptive Discussions in Conference Calls", Stanford GSB Research Paper No. 2060 Rock Center for Corporate Governance Working Paper No. 83, Jul. 29, 2010, 69 pages.

Pierce, David, "World Too Loud? Just Turn it Down-With These Fancy New Earbuds.", ASU | New America | Slate, Jun. 3, 2015 9:48 AM, 7 pages, <http://www.slate.com/blogs/future_tense/2015/06/03/here_earbuds_startup_makes_earbuds_that_let_you_adjust_the_volume_of_real.html>.

Yankelovich et al., "Improving Audio Conferencing: Are Two Ears Better than One?", CSCW '06, Nov. 4-8, 2006, Banff, Alberta, Canada, © Sun Microsystems, Inc., ACM 1-59593-249-6/06/0004, 10 pages.

Abuelsaad et al., "Context Based Identification of Non-Relevant Verbal Communications", U.S. Appl. No. 15/601,092, filed May 22, 2017, pp. 1-27.

IBM Appendix P, "List of IBM Patents or Patent Applications to be Treated as Related", Dated Dec. 26, 2017, 2 pages.

* cited by examiner

CONTEXT BASED IDENTIFICATION OF NON-RELEVANT VERBAL COMMUNICATIONS

BACKGROUND

The present disclosure relates generally to multi-party communications and in particular to filtering communications.

A multi-party communication or teleconference (i.e., telephone conference, audio conference, and video conference) is the live exchange and mass articulation of information among several individuals. Teleconferences enable individuals to communicate or conduct meetings without requiring all of the participants to be physically present in the same location. Accordingly, teleconferences can reduce or eliminate the time and expense required to travel to a common location in order to conduct a meeting. During a teleconference, individual participants listen and speak with other participants via telephones linked by a telecommunications system. If multiple participants are located in the same space, a speakerphone may be used. A speakerphone allows multiple individuals to participate in a conversation by broadcasting the voices of participants on the other end of the phone line, while the microphone captures the voices of those using the speakerphone. However, the microphone may also capture conversations and noises that are irrelevant or distracting to the current conversational topic.

SUMMARY

A computer-implemented method includes identifying a first set of utterances from a plurality of utterances. The plurality of utterances is associated with a conversation and transmitted via a plurality of audio signals. The computer-implemented method further includes mining the first set of utterances for a first context. The computer-implemented method further includes determining that the first context associated with the first set of utterances is not relevant to a second context associated with the conversation. The computer-implemented method further includes dynamically muting, for at least a first period of time, a first audio signal in the plurality of audio signals corresponding to the first set of utterances. A corresponding computer system and computer program product are also disclosed.

DETAILED DESCRIPTION

Figure 1:
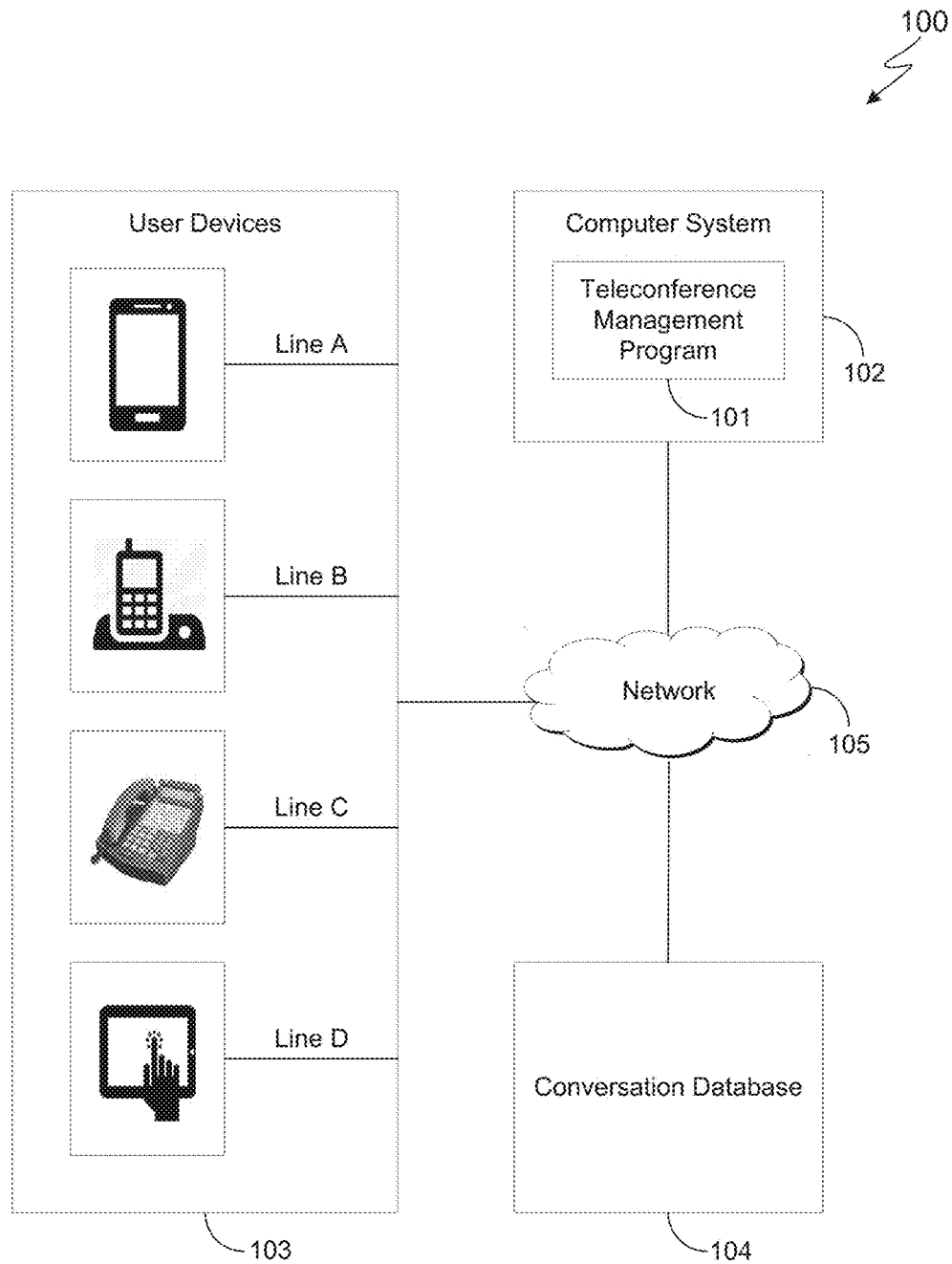
FIG. 1 is a functional block diagram of a computing environment suitable for operation of a teleconference management program in accordance with at least one embodiment of the invention.

Teleconferences are prone to secondary conversations and background noises that can be distracting to the current speaker, as well as to those who are listening. These secondary conversations and background noises tend to become amplified as the number of participants increases. Furthermore, teleconferences are often conducted by individuals who reside in different time zones. This too can result in an increase in the number of secondary conversations and background noises. For example, a teleconference is held between individuals residing in the United States and India. If the teleconference is scheduled to begin at 10:00 am Eastern Standard Time (EST), the teleconference will begin at 7:30 pm Indian Standard Time (IST) for those individuals who live in India. In this scenario, the individuals residing in the United States are likely to be in a workplace setting, while those individuals residing in India are likely to be at home. Accordingly, secondary conversations may occur between a person listening in on the call and a family member present within the household. Similarly, background noises, such as radios, televisions, and appliances may be transmitted to the other participants of the teleconference.

Generally, lines with poor audio quality or unwanted sounds can be identified. However, a current solution to eliminating lines with poor audio quality or unwanted sounds requires an individual, such as a current speaker or a meeting moderator, to verbally request that individuals on other phone lines mute their phones or please be quiet. This can lead to a disruption from a current conversation, as well as a loss of train of thought by the current speaker.

Embodiments of the present invention provide for the identification and elimination of non-relevant verbal communications (i.e., utterances) and background noises. The content of verbal communications generated by speakers during a conference call are analyzed to determine whether the verbal communications are contextually relevant to the meeting. In an embodiment of the invention, the content of a current speaker is analyzed to determine whether the content of the current speaker is contextually relevant to the content of a previous speaker.

Embodiments of the present invention provide for analyzing conversational keywords, phrases, topics, and themes over time to determine whether specific conversations are outside an expected context of a conference or meeting. Embodiments of the present invention provide for inferring additional potential topics of discussion based on a general meeting agenda. Embodiments of the present invention provide for real-time analysis and modification of meeting topics to determine future trends and themes that may be contextually relevant.

Embodiments of the present invention provide for dynamically muting a telephone, speakerphone, or any other generally known communications device if the content of a conversation received from a device is determined to be outside an expected context of a current conversational topic. In some embodiments, a conversation between participants whose line has been muted is monitored for content relating to the current topic of discussion. In these embodiments, the telephone or speakerphone is dynamically unmuted if the conversation between these participants is later determined to be contextually relevant to the current topic of discussion.

Embodiments of the present invention provide for redacting and/or eliminating unrelated conversations and background noises from a conference call. In embodiments of the invention, a centralized conferencing system is configured to allow for the buffer or delay of conversations so that irrelevant conversations are removed or redacted prior to being heard by other members. In some embodiments, a notification is sent to those members whose line has been muted. Examples of a notification may include, but are not limited to, a standard message service (SMS) (i.e., text-message) notification, an email notification, a verbal notification, and a visual notification (e.g., blinking light on a communications device) that is transmitted to the line that has been muted. In an embodiment, a text translation of any unrelated conversations redacted, eliminated, or otherwise muted from the conference call is provided concurrently with a conference or meeting. For example, a transcript of utterances that are muted is presented to conference members via pdf, email, or SMS notification. In another example, utterances that are muted are displayed as subtitles on a display screen during a video broadcast of a conference. In some embodiments, an audio copy of any unrelated conversations redacted and/or or eliminated from the conference call is provided to the members. Various embodiments of the present invention may address or improve upon some or all of the aforementioned problems or disadvantages, however it will be understood that addressing any particular problem or disadvantage is not a necessary requirement for the practice of all embodiments of the present invention.

Referring now to various embodiments of the invention in more detail, FIG. 1 is a functional block diagram of a computing environment, generally designated 100, suitable for operation of a teleconference management program 101 in accordance with at least one embodiment of the invention. FIG. 1 provides only an illustration of one implementation of the invention and does not imply any limitations with regard to the environments in which different embodiments may be implemented. Many modifications to the depicted environment may be made by those skilled in the art without departing from the scope of the invention as recited by the claims.

Computing environment 100 includes computer system 102, user devices 103, and conversation database 104 interconnected over network 105. Network 105 can be, for example, a telecommunications network, a local area network (LAN), a wide area network (WAN), such as the Internet, or a combination of the three, and can include wired, wireless, or fiber optic connections. Network 105 may include one or more wired and/or wireless networks that are capable of receiving and transmitting data, voice, and/or video signals, including multimedia signals that include voice, data, and video information. In general, network 105 may be any combination of connections and protocols that will support communications between computer system 102, plurality of user devices 103, conversation database 104, and other computing devices (not shown) within computing environment 100.

Computer system 102 can be a standalone computing device, a management server, a web server, a mobile computing device, or any other electronic device or computing system capable of receiving, sending, and processing data. In other embodiments, computer system 102 can represent a server computing system utilizing multiple computers as a server system, such as in a cloud computing environment. In an embodiment, computer system 102 represents a computing system utilizing clustered computers and components (e.g., database server computers, application server computers, etc.) that act as a single pool of seamless resources when accessed within computing environment 100. Computer system 102 includes DDI program 101. Computer system 102 may include internal and external hardware components, as depicted and described in further detail with respect to FIG. 3.

User devices 103 can be a laptop computer, tablet computer, smartphone, smartwatch, or any programmable electronic device capable of communicating with various components and devices within computing environment 100, via network 105. In general, user devices 103 represent any programmable electronic devices or combination of programmable electronic devices capable of executing machine readable program instructions and communicating with other computing devices (not shown) within computing environment 100 via a network, such as network 105.

In embodiments of the invention, user devices 103 include one or more speakerphones for use in an audio or video conference. A speakerphone is a telephone that includes at least a loudspeaker, a microphone, and one or more microprocessors. In embodiments of the invention, user devices 103 include one or more voice over internet protocol (VoIP) compatible devices (i.e., Voice over IP, IP telephony, broadband telephony, and broadband phone service). VoIP is a methodology and group of technologies for the delivery of voice communications and multimedia sessions over internet protocol (IP) networks, such as the Internet. VoIP may be integrated into smartphones, personal computers, and any general computing devices, such as user devices 103, which are capable of communication with network 105.

A user device may include a user interface (not independently shown on FIG. 1). User interface 106 provides an interface between a user device and computer system 102. In one embodiment, the user interface may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, the user interface may also be mobile application software that provides an interface between each user device and computer system 102. Mobile application software, or an "app," is a computer program that runs on smartphones, tablet computers, smartwatches and any other mobile devices.

Conversation database 104 is configured to store various information to be accessed and analyzed by teleconference management program 101. In some embodiments, conversation database 104 includes conference information (e.g., text materials, slides, meeting agendas, online related materials, calendar information, and meeting participants) used to determine contextual information about a conference. In embodiments of the invention, conversation database 104 includes key terms and phrases spoken during a conference. In embodiments of the invention, teleconference management program 101 extracts topics or concepts of conversations during a conference and stores this information in conversation database 104. In some embodiments, teleconference management program 101 logs how recent each topic or concept is discussed, as well as the amount of time each topic or concept has been discussed. In some embodiments, conversation database 104 includes identity information relating to conference participants.

Figure 2:
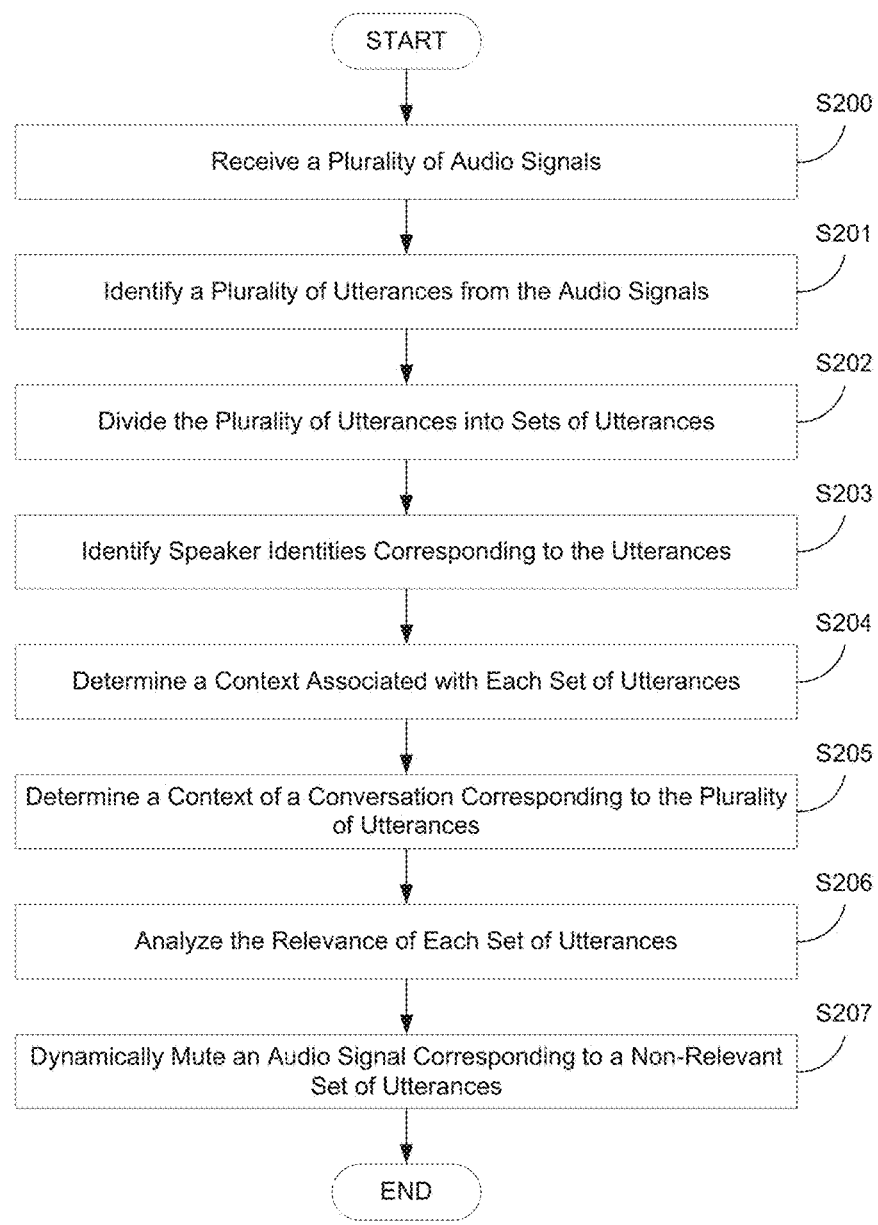
FIG. 2 is a flow chart diagram depicting operational steps for a teleconference management program in accordance with at least one embodiment of the invention.

FIG. 2 is a flow chart diagram depicting operational steps for a teleconference management program in accordance with at least one embodiment of the invention. It should be appreciated that embodiments of the present invention provide for the real-time analysis of meeting topics to determine current, as well as future trends and themes that may be contextually relevant during the conference or meeting. Embodiments of the present invention further provide for analyzing conversational topics and themes over time to determine whether specific verbal communications and conversations are outside an expected context of a current discussion.

In accordance with FIG. 2, the following exemplary scenario will be used. In this exemplary scenario, a teleconference is currently being conducted to discuss planning for an automotive tradeshow. Currently, four conference lines (Line A, Line B, Line C, and Line D) (independently shown in FIG. 1) have joined the teleconference. Line A is a mobile phone with a single participant currently sitting in a waiting area of an airport. Line B is a cordless phone with a single participant sitting in an office. Line C is a speaker phone with a group of participants located in a conference room. Line D is a mobile tablet with a single participant located at home.

At step S200, teleconference management program 101 receives a plurality of audio signals from plurality of user devices 103. In some embodiments, plurality of user devices 103 are connected to a telecommunications system via network 105. In some embodiments, teleconference management program 101 buffers or delays the audio signals for an initial period of time (e.g., 5 seconds) to allow teleconference management program 101 to analyze the audio signals before the audio reaches any conference members. Buffering or delaying audio signals allows teleconference management program 101 to redact or filter non-relevant conversations or background noises that deviate from a current topic of discussion prior to being heard by members of the teleconference. In alternative embodiments, teleconference management program 101 does not buffer or delay the plurality of audio signals. Here, teleconference management program 101 analyzes the audio signals in real-time.

At step S201, teleconference management program 101 identifies a plurality of utterances from the plurality of audio signals. An utterance may generally be understood as a verbal communication (e.g., word or statement), non-lexical communication (e.g., exclamations, sighs, laughs, cries, and shouts), or background noises detected by teleconference management program 101 during a teleconference. In some embodiments, teleconference management program 101 identifies utterances based on converting audio signals into text. In these embodiments, teleconference management program 101 converts audio signals into text using speech-to-text (STT) software. In an embodiment, the text is converted into a Unicode format (i.e., a universal encoding standard used for representing text for computer processing). In an embodiment, the text is converted into a speech synthesis mark-up language (SSML) format. In an embodiment, the raw text containing symbols (e.g., numbers and abbreviations) is converted into the equivalent of written-out words through text normalization (i.e., pre-processing or tokenization).

In some embodiments, teleconference management program 101 identifies utterances without the use of STT software or natural language processing (NLP) software. In these embodiments, teleconference management program 101 uses automatic speech recognition (ASR) software to identify utterances. ASR software breaks down each utterance into phonemes. Each phoneme is then analyzed in sequence. In an embodiment, teleconference management program 101 generates an acoustic model that textually represents the relationship between each audio signal and the phonemes or other linguistic units that make up speech. The acoustic model includes statistical representations of the sounds that make up each word.

In some embodiments, teleconference management program 101 identifies utterances based on comparing sounds corresponding to each audio signal with word sequences. More specifically, teleconference management program 101 compares sounds corresponding to each utterance to a language model. A language model provides context to distinguish between words and phrases that sound similar (e.g., "recognize speech" and "wreck a nice beach" are pronounced similarly but have very different meanings). In an embodiment, teleconference management program 101 compares sounds corresponding to each utterance to a positional language model. A positional language model describes the probability of given words occurring close to one another, but not necessarily immediately adjacent, in a text.

In an embodiment, teleconference management program 101 segments each audio signal into one or more of the following speech units: phones, diphones, half-phones, syllables, morphemes, words, phrases, and sentences. In an embodiment, teleconference management program 101 determines intonational attributes associated with the utterances. Intonational attributes may include, but are not limited to, pitch envelope (i.e., a combination of the speaking fundamental frequency, pitch range, and the shape and timing of the pitch contour), overall speech rate, utterance timing (i.e., duration of segments and pauses), vocal quality, and intensity (i.e., loudness). Teleconference management program 101 stores the speech units and intonational attributes corresponding to the utterances in conversation database 104.

At step S202, teleconference management program 101 divides the plurality utterances into sets of utterances. In embodiments of the invention, each set of utterances is based on a speaker's vocal identity. Here, teleconference management program 101 uses speaker diarisation software to identify when the same individual is speaking. Diarisation is the process of segmenting an audio signal into homogenous segments according to the speaker identity. Speaker diarisation includes speaker segmentation (i.e., finding speaker change points in an audio stream) and speaker clustering (i.e., grouping together speech segments based on intonational attributes). In alternative embodiments, each set of utterances is divided based on a telecommunications line from which an audio signal carrying the set of utterances is transmitted.

At step S203, teleconference management program 101 identifies an identity associated with each set of utterances. In an embodiment, teleconference management program 101 uses speaker verification software to verify an identity of a speaker associated with a set of utterances. Here, a speech sample (i.e., utterance) is compared against a previously created voice signature (i.e., voice print, template, or model). In an embodiment, teleconference management program 101 uses voice recognition software (i.e., speaker identification software) to identify an identity of a speaker associated with a set of utterances. Speaker identification software identifies a speaker based on unique characteristics included within a speech sample. The speech sample is compared against multiple voice prints in order to determine the best match. For example, teleconference management program 101 retrieves labeled training data (i.e., known vocal samples) of intonational attributes associated with previously recorded audio of meeting participants. Based on matching the intonational attributes of a known vocal sample with the intonational attributes associated with a portion of the utterances received during the teleconference, a speaker's identity can be identified. In an embodiment, teleconference management program 101 uses a Gaussian mixture speaker model to identify an identity of a speaker associated with a set of utterances.

In some embodiments, teleconference management program 101 identifies an identity of a speaker associated with a set of utterances via facial recognition software. For example, teleconference management program 101 captures an image of a speaker via a camera built into plurality of user devices 103. In another example, teleconference management program breaks down video received from a recording device built into plurality of user devices 103 into multiple video frames. In these embodiments, teleconference management program 101 employs a speaker image dataset and image analysis software (i.e., comparing selected facial features from the image or video frame with facial features corresponding to the speaker image dataset) to identify a speaker.

At step S204, teleconference management program 101 determines a context associated with each set of utterances. In some embodiments, teleconference management program 101 determines a context through the use of text mining software to extract keywords from a textual transcript corresponding to a set of utterances. Text mining (i.e., text data mining, text analytics) is the process of deriving high-quality information from text. Within the field of text mining, keyword extraction is the automatic identification of terms that best describe or characterize the subject of text document. Here, each set of utterances is transcribed into text through STT software and keywords are identified within the transcribed text document. In some embodiments, teleconference management program 101 determines a context through the use of speech analytics software (i.e., audio mining software) to spot keywords and phrases from a set of utterances. Here, phoneme sequences corresponding to the set of utterances are matched with phoneme sequences of words. It should be appreciated that by using intermediate representations (including, but not limited to, phonetic posteriorgrams and lattice representations) to match phoneme sequences, a context may be determined without requiring the use of STT software.

At step S205, teleconference management program determines a context of a conversation (i.e., a current topic of discussion) corresponding to the plurality of utterances. In some embodiments, a current topic of discussion is determined based, at least in part, through the use of speech analytics software. Speech analytics software is the process of analyzing categorical topics of discussion by isolating words and phrases that are most frequently used within a given time period and indicating whether the usage is trending up or down. For example, if the term "catering" is identified from the plurality of utterances more than five times within a one minute time period, teleconference management program 101 may determine that the current topic of discussion revolves around catering.

In some embodiments, a current topic of discussion is further determined based on matching contextual information presented during a topic of discussion with the keywords or phrases identified from the plurality of utterances. In an embodiment, teleconference management program 101 uses named entity recognition (NER) software to identify names of people, places, locations, organizations, etc. included in text, images, and video data presented during the teleconference. For example, names of catering companies are identified from a PDF document and, in response, are determined to match the current topic of discussion "catering." In an embodiment, teleconference management program 101 uses optical character recognition (OCR) software to convert images of typed, handwritten, or printed text into machine readable text. For example, names of a catering companies are identified from an image presented via a video conferencing application and, in response, are determined to match the current topic of discussion "catering." In an embodiment, teleconference management program 101 uses computer vision software (including object recognition software) to find and identify objects in an image or video sequence. Computer vision includes methods for acquiring, processing, analyzing, and understanding digital images. For example, a logo of a catering company is identified from video streamed via a webinar application and, in response, are determined to match the current topic of discussion "catering."

At step S206, teleconference management program 101 analyzes the relevance of each set of utterances. In embodiments of the invention, teleconference management program 101 analyzes a relevance of each set of utterances based, at least in part, on comparing the context associated with each set of utterances with the current topic of discussion. For example, as the teleconference progresses, teleconference management program 101 continues to track key topics of discussion, as well as contexts associated with each set of utterances. The current topic of discussion revolves around venues. Currently, June, on Line D, is speaking about locations for the tradeshow. While June is speaking, teleconference management program 101 detects that John, on Line A, is also speaking. Based on keywords and/or phrases associated with utterances from John, John's utterances are determined to be associated with the context "music." Since the context "music" is not contextually relevant to the current topic of discussion "venues," teleconference management program 101 will determine that John's set of utterances are not relevant to the current discussion.

It should be noted that what is deemed to be contextually relevant may change as a discussion transitions from one topic to another. Accordingly, in some embodiments, a relevance of each set of utterances is further based on inferring additional topics that may be contextually relevant to the current topic of discussion. In these embodiments, teleconference management program 101 uses concept expansion software (i.e., semantic lexicon induction software or semantic set expansion software) to infer additional topics that may potentially be related to the current topic of discussion. Concept expansion software provides for the development and expansion of semantic classes.

For example, at the beginning of the teleconference, the current topic of discussion is determined to generally revolve around planning for the automotive tradeshow. Based on mentioning the term "tradeshow" multiple times within a given time period (e.g., 20 seconds), the concept of the semantic class "tradeshow" is expanded to include concepts and terms associated with a tradeshow, such as venue, catering, invitation, seating, companies, and automotive products. Each of these concepts may then be further expanded. For example, the semantic class "automotive products" may be expanded to include tires, brakes, engines, and transmissions. Thus, although a discussion may revolve around a particular topic, teleconference management program 101 may determine that a context associated with a set of utterances that appears to deviate from a current topic of discussion is in fact relevant to the current discussion.

In some embodiments, analyzing the relevance of each set of utterances is further based on identifying dialog acts. A dialog act is a specialized speech act, such as greetings, meta questions (e.g., "What can I say?"), yes or no questions, statements, and requests. For example, a current discussion revolves around determining a venue for the automotive tradeshow. Jim, a speaker on Line B, is currently controlling the conversation since he is located in the city hosting the tradeshow. At times, John, on Line A, attempts to interject into the discussion. Although John's words are determined to be in conflict with the current conversation headed by Jim, teleconference management program 101 determines that John's interjection is merely a statement or request, such as "excuse me" or "may I speak" and thus are relevant to the current conversation.

At step S207, teleconference management program 101 dynamically mutes an audio signal corresponding to a non-relevant set of utterances. In embodiments of the invention, an audio signal is muted based, at least in part, on a determination that at least a portion of a set of utterances is non-relevant to a current topic of discussion. In some embodiments, a decision to dynamically mute an audio signal is further based on a weighted score assigned to each speaker. In this embodiment, teleconference management program 101 assigns a weighted score to each speaker based on the speaker's identity (e.g., job title (e.g., president, CEO, manager, supervisor, and employee) or occupation (e.g., political figure, professor, and scientist). For example, Jill, on Line C, is identified as an employee of the company hosting the tradeshow. Jill is currently discussing potential catering companies for the tradeshow. However, the president of the company, June, on Line D has interjected with a question about potential venues for the tradeshow. Although the topic of "venues" may be non-relevant to the current discussion of "catering," if June's weighted score is greater than Jill's weighted score, teleconference management program 101 will not mute Line D. Similarly, a higher score may be given to the person who is leading the conversation, since it is less likely that this person should be muted due to their importance to a conversation.

In some embodiments, a decision to dynamically mute an audio signal is further based on a likelihood of a speaker to engage in secondary conversations or generate background noises. A secondary conversation may generally be understood as a set of utterances that is not relevant to a current topic of discussion. In these embodiments, an audio signal associated with a speaker is flagged if the speaker has partaken in secondary conversations or generated background noises above a given threshold (e.g., more than three secondary conversations over a period of one month). In an embodiment, teleconference management program 101 dynamically mutes an audio line of a speaker who has been flagged faster than other speakers who have not been flagged. Here, the term "faster" pertains to an amount of time for a determination to be reached that a conversation is not relevant to a current topic of discussion. For example, teleconference management program 101 determines that conversations by both John and Jim are likely to be non-relevant to the current discussion about venues. However, if John's line has been flagged, teleconference management program 101 may determine in a shorter amount of time that John's conversation is likely to be non-relevant. Accordingly, John's line is muted sooner than Jim's line.

In alternative embodiments, teleconference management program 101 dynamically lowers the volume of an audio signal. In an embodiment, teleconference management program 101 dynamically lowers the volume of an audio signal based on a location from which the audio signal is transmitted. Here, teleconference management program 101 determines a likelihood of incurring secondary conversations and background noises based on location. For example, John, on Line A, is located in an airport, while Jim, on Line B, is located in an office setting. Since secondary conversations and background noises are more likely to occur in an airport than in an office setting, teleconference management program 101 lowers the volume of a microphone of built into John's mobile phone. However, John may manually increase the microphone volume if he needs to speak. Once the speaker is finished speaking, teleconference management program 101 once again automatically lowers the microphone volume. In an embodiment teleconference management program 101 dynamically lowers an audio signal based on an identity of a speaker associated with the audio signal. Here, teleconference management program 101 determines a likelihood of incurring secondary conversations and background noises based on speaker identity. For example, if a speaker has been flagged (i.e., the speaker has partaken in secondary conversations or generated background noises above a given threshold), the speaker's microphone is dynamically lowered.

Figure 3:
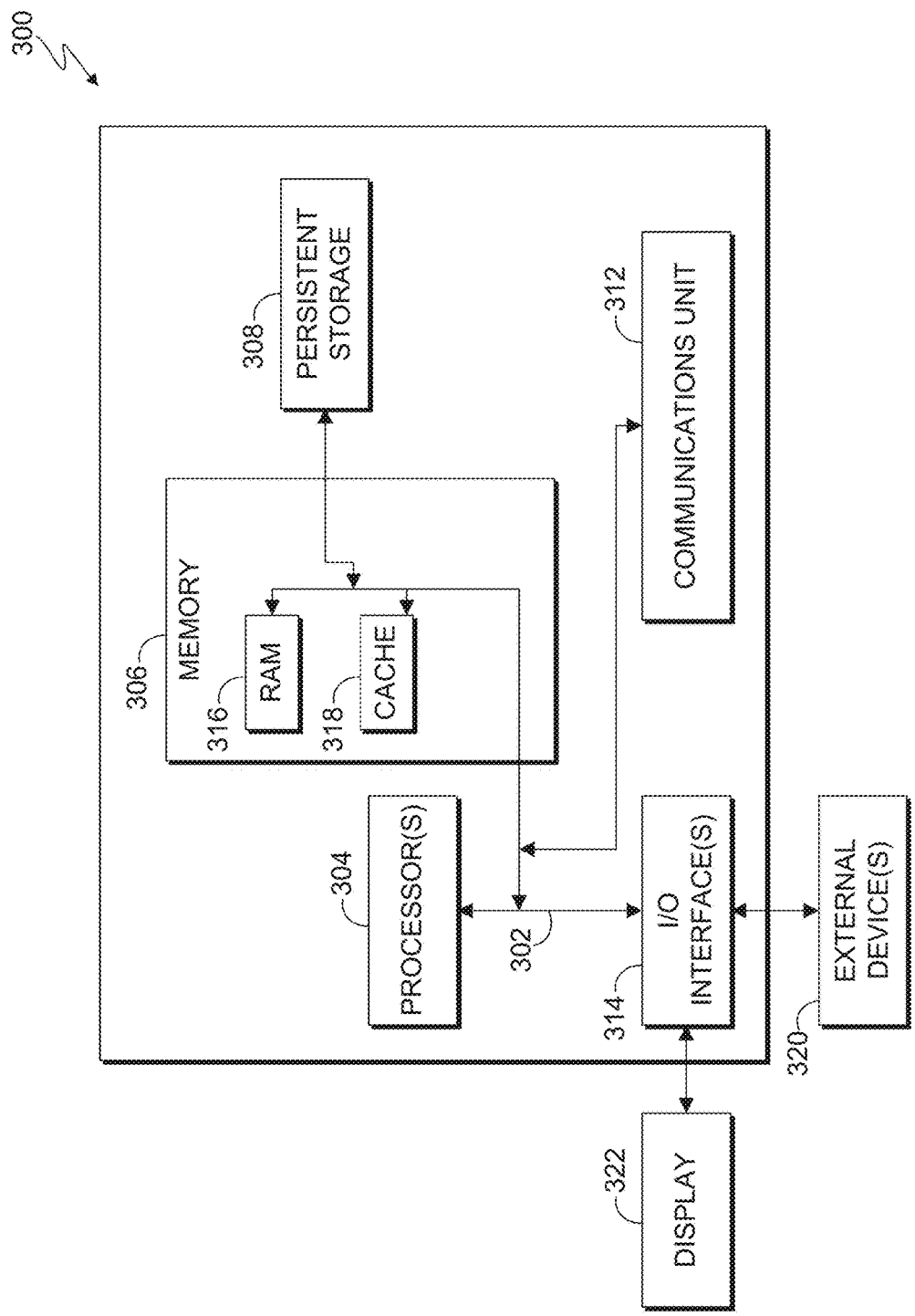
FIG. 3 is a block diagram depicting components of a computer suitable for executing a teleconference management program in accordance with at least one embodiment of the invention.

FIG. 3 is a block diagram depicting components of a computer 300 suitable for executing teleconference management program 101, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for teleconference management program 101 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to, the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a first set of utterances from a plurality of utterances, wherein:
      the plurality of utterances is associated with a conversation; and
      the plurality of utterances is transmitted via a plurality of audio signals;
   mining the first set of utterances for a first context;
   determining that the first context associated with the first set of utterances is not relevant to a second context associated with the conversation;
   responsive to determining that the first context is not relevant to the second context, dynamically muting, for at least a first period of time, a first audio signal in the plurality of audio signals corresponding to the first set of utterances;
   responsive to dynamically muting the first audio signal:
      transmitting a notification that the first audio signal is muted;
      generating a transcript of the first set of utterances corresponding to the first audio signal that is muted;
      presenting the transcript in conjunction with the conversation;
      monitoring the first audio signal corresponding to the first set of utterances; and
      determining that a second set of utterances corresponding to the first audio signal is relevant to the conversation;
   responsive to determining the second set of utterances is relevant to the conversation, dynamically unmuting, for at least a second period of time, the first audio signal;
   identifying a location from which a second audio signal in the plurality of audio signals is transmitted;
   determining, based on the location, that the second audio signal include one or more utterances that are not relevant to the conversation;
   responsive to the determination:
      dynamically lowering volume of the second audio signal;
   identifying an identity of a speaker associated with a third audio signal;
   determining, based on the identity of the speaker, that the third audio signal include one or more utterances that are not relevant to the conversation; and
   responsive to the determination:
      dynamically lowering volume of the third audio signal.

* * * * *